Figure 1:
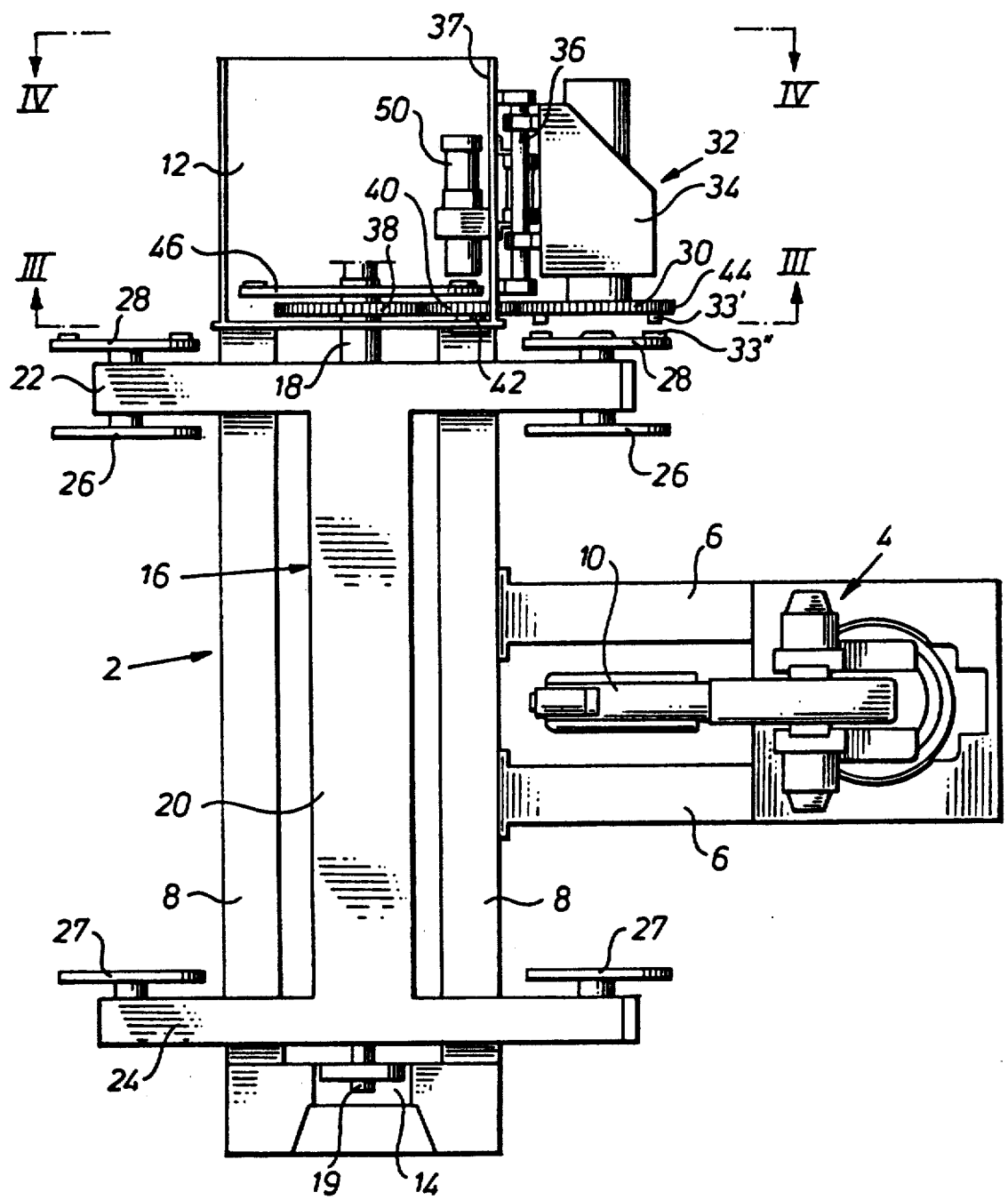

United States Patent [19]

Johansson

[11] Patent Number: 5,074,741
[45] Date of Patent: Dec. 24, 1991

[54] MANIPULATOR INTENDED FOR COOPERATION WITH AN INDUSTRIAL ROBOT

[75] Inventor: John Ingvar E. Johansson, Torsas, Sweden

[73] Assignee: Torsteknik AB, Torsas, Sweden

[21] Appl. No.: 494,723

[22] Filed: Mar. 16, 1990

[51] Int. Cl.$^5$ ............................................. B66C 13/00
[52] U.S. Cl. ...................................... 414/736; 269/57; 269/61; 901/6; 901/8; 414/225
[58] Field of Search ............... 414/735, 736, 680, 225; 901/41, 6, 8; 269/56, 57, 61, 63; 29/48.5 A, 35.5

[56] References Cited

U.S. PATENT DOCUMENTS 3,799,006 3/1974 Keller .
4,666,363 5/1987 Johansson ..................... 414/736
4,741,078 5/1988 Kimura ........................ 901/41 X

FOREIGN PATENT DOCUMENTS 1096722 5/1961 Fed. Rep. of Germany .
3701504 7/1987 Fed. Rep. of Germany .
3802491 3/1989 Fed. Rep. of Germany .
134061 10/1919 United Kingdom .

Primary Examiner—Robert J. Spar
Assistant Examiner—Donald W. Underwood
Attorney, Agent, or Firm—Townsend and Townsend

[57] ABSTRACT

The invention relates to a manipulator for positioning workpieces with respect to an industrial robot (4) by which the work pieces, one after the other, are to be processed. The manipulator (2) comprises at least two fixture supports (26,27) each having fixture members for holding a respective work piece, a holder (16) for the fixture supports, movably suspended for moving one of said fixture supports from a loading position, in which exchange of a work piece held in said fixture members may take place, towards an operative position within the operating range of the robot, while simultaneously moving another one of said fixtures from the operative position towards the loading position. A turning servo motor (32) common to the fixture supports is drivingly engageable with a fixture support (26) held in the operative position so as to be able to rotate said fixture support, e.g. as controlled by a control system coordinating the operation of the motor with the operational movements of the robot in order to render various surface portions and parts of the work piece accessible to an implement handled by the robot. Coupling structures (30,38,40) are arranged for drivingly coupling said motor (32) to said holder (16) when the motor is out of engagement with any fixture support so as to enable use of the motor (32) as a driving structure for said holder (16) during the operative movements thereof.

2 Claims, 3 Drawing Sheets

MANIPULATOR INTENDED FOR COOPERATION WITH AN INDUSTRIAL ROBOT

The present invention relates to a manipulator for positioning workpieces relatively to an industrial robot, by means of which the work pieces, one after the other, are to be processed, said manipulator comprising at least two fixture supports each having fixture means for holding a respective work piece, moving means for moving one of said fixture supports from a loading position, in which exchange of a work piece held in said fixture means may take place, towards an operative position within the operating range of the robot, while simultanously moving another one of said fixtures from the operative position towards the loading position, driving means for said moving means, and a turning servo motor common to the fixture supports and drivingly engable with a fixture support held in the operative position so as to be able to rotate said fixture support, e.g. as controlled by a control system coordinating the operation of the motor with the operational movements of the robot in order to render various surface portions and parts of the work piece accessible to an implement handled by the robot. This implement may for example be a welding gun, by means of which parts of a work piece are to be welded together, or a spray gun, by means of which a work piece is to be surface treated.

A manipulator of the kind defined above is known through Swedish patent specification 437627. This manipulator offers many advantages such as that the robot does not need to be moved during its operation and may be utilized to an optimum extent, and furthermore needs only one common rotating motor for the fixture supports. In particular the latter makes this manipulator cheap and easy to manufacture, while satisfying all reasonable functional demands.

One object of the present invention is to provide a manipulator of this kind which has been further improved by being still more simple and cheap to manufacture, and in particular by allowing a more exact and accurate control of all the working movements of the manipulator.

This object has been attained in that coupling means are arranged for drivingly coupling said motor to said moving means when the motor is out of engagement with any fixture support so as to enable use of the motor as said driving means for the moving means.

By using the servo motor also for moving the fixture supports between the loading and operative positions, not only the need to use a particular motor for this purpose has been eliminated, but also it will now be possible to use the control system of the robot for programming and controling all functions of the manipulator, including the movements of the fixture supports between the load and operative positions thereof. Thereby said control becomes more exact and accurate.

Figure 2:
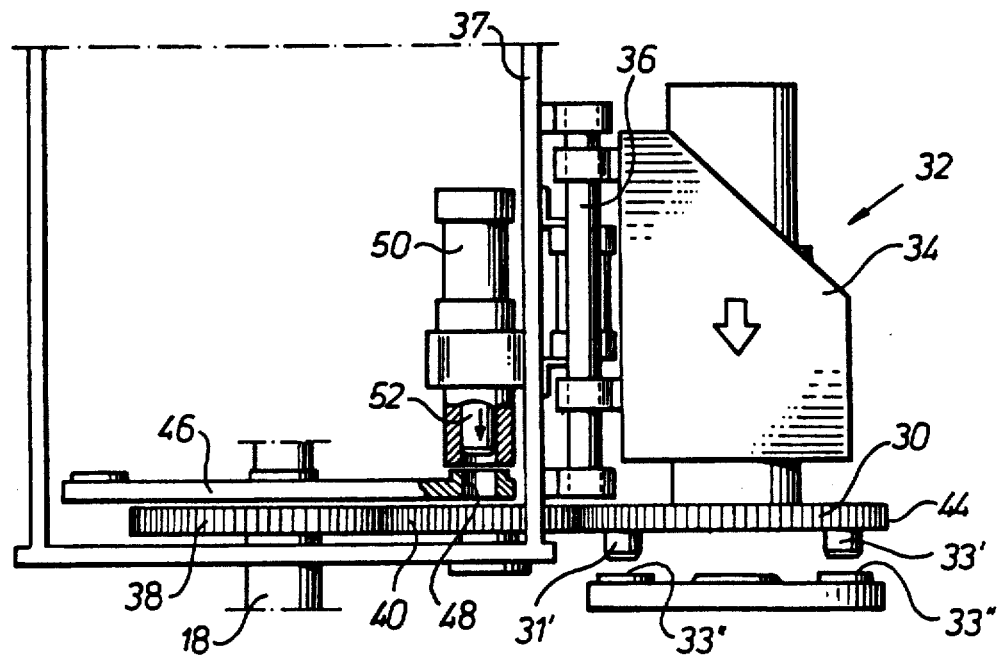
Figure 3:
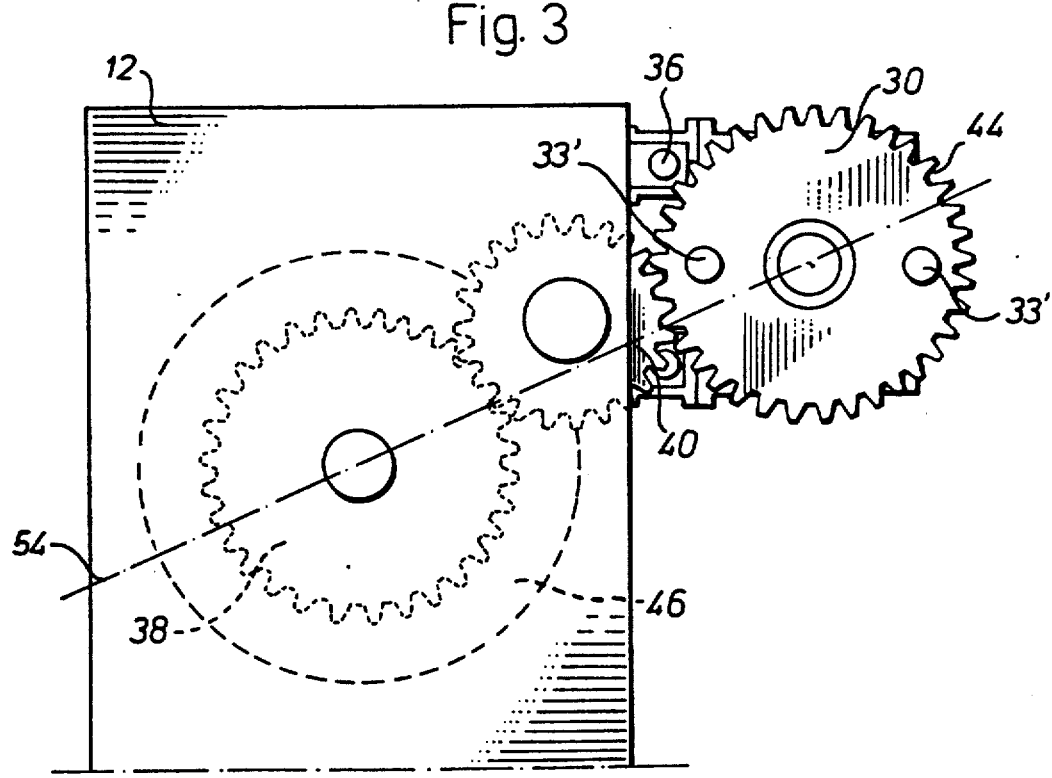
Figure 4:
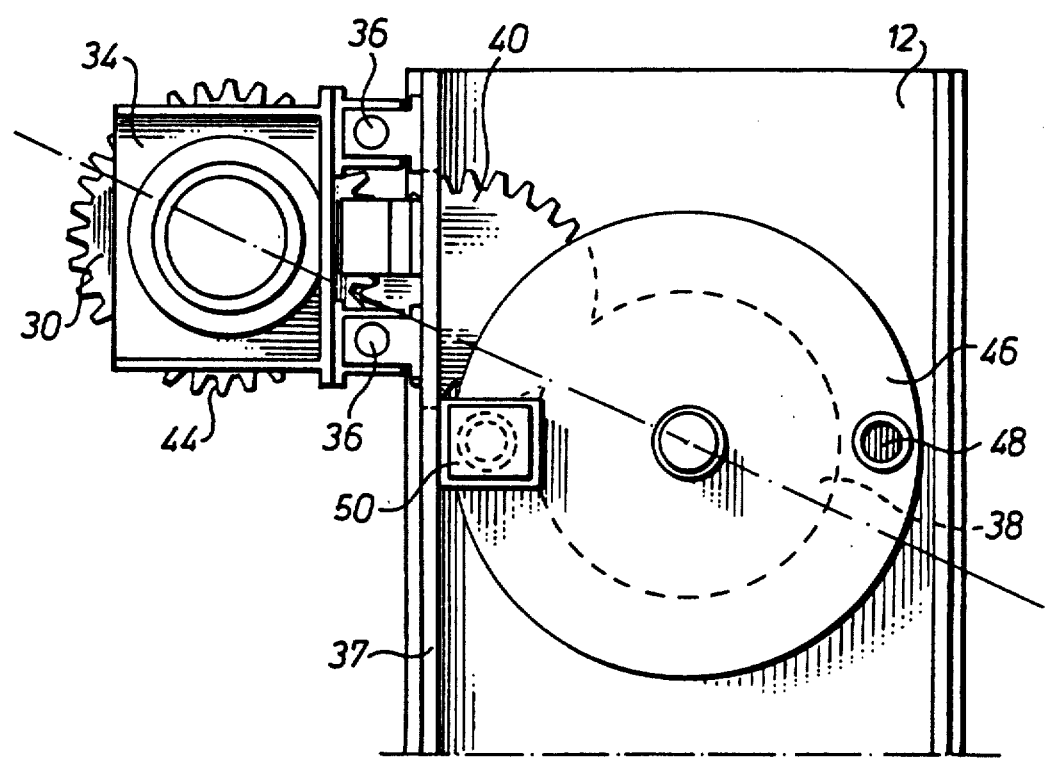

The invention will now be described more closely below with reference to an embodiment thereof shown on the drawings, on which FIG. 1 is a plan view of a manipulator according to the invention with an associated industrial robot, FIG. 2 to a greater scale and partly in section illustrates a portion of the plan view of FIG. 1, FIG. 3 is a section in the direction of arrows III—III in FIG. 1, and FIG. 4 is a section in the direction of arrows IV—IV in FIG. 1.

In FIG. 1 numeral 2 generally designates a manipulator according to the invention, cooperating with an industrial robot 4 which is stationarily located in relation to the manipulator 2. More particularly the base of the robot 4 by means of base beams 6 is connected to base beams 8 of the manipulator 2. The robot 4 is of a type, known per se, having an implement supporting arm 10 which may be swung horizontally and vertically, as well as be moved in its longitudinal direction to be able to wield an implement over a work piece. The detailed design of the robot 4 is irrelevant to the invention, but it should be clear that it is operated according to a predetermined program adapted to the work piece in question.

The manipulator 2 comprises a main stand 12 and a secondary stand 14 secured to opposite ends of the base beams 8 and supporting between them a generally H-shaped holder 16 which is rotatable about a horizontal main axis represented by pivots 18 and 19 journalled in bearings, not shown, supported by the stands 12 and 14, respectively. The holder 16 has a hollow central beam 20 extending in parallel to the main axis of the holder, and a pair of hollow transverse beams 22 and 24, respectively, which are arranged at the respective ends of the central beam 20.

Two first fixture supporting plates 26 are rotatably mounted on the beam 22 near the ends thereof at equal distances from the main axis of the holder, and with their axes extending in parallel with said main axis. More particularly, the fixture supporting plates 26 are located on the side of the beam 22 facing away from the main stand 12.

Two second fixture supporting plates 27 are rotatably mounted on the beam 24 near the ends thereof at equal distances from the main axis of the holder, and with their axes extending in parallel with said main axis. More particularly, the second fixture supporting plates 27 are located on the side of the beam 24 facing the main stand 12 and axially in line with the first fixture support plates 26. Thus, there are two pairs of a first fixture support plate 26 and a second fixture support plate 27 facing each other. The plates 26 and 27 of each pair are mutually interconnected so as to run synchronously, e.g. by means of chain transmissions extending within the hollow beam members 20, 22 and 24.

By means of an associated shaft each fixture supporting plate 26 is non-rotatably secured to a corresponding clutch plate 28 located on the other side of the beam 22. A drive plate 30 secured to the shaft of a turning servo motor 32 is adapted to engage the two clutch plates 28 alternately in a manner to be described more closely below. More particlarly, the drive plate 30 and each clutch plate 28 on the sides thereof facing each other carry complementary mutually engagable surface engagement means 33' and 33", respectively, e.g. in the form of complementary shaped holes and protrusions, the design of which should be evident to the man of the art.

The rotational movements of the motor 32 are to be coordinated with the operational movements of the robot 4 by means of a robot control system, not shown, which can be known per se. The motor 32, which may be permanently connected to the control system of the robot, is carried on a slide 34, which is movable on a guide 36 in the axial direction of the motor 32 by means of a moving mechanism, not shown, in the form of a double-acting pneumatic cylinder or similar. As shown, the guide 36 is mounted on one side of a wall 37 of the main stand 12.

The fixture supporting plates 26 and 27 are designed so as to permit attachment thereto of suitable fixture members for retaining work pieces in a manner known in the art.

The elements of the manipulator described thus far above may be essentially the same as corresponding elements of the manipulator described in the above mentioned Swedish patent specification 437627. For more details regarding the construction and function of these elements reference is made to said specification.

The pivot 19 of the holder 16 carries a first tooth wheel 38 meshing with a second tooth wheel 40 rotatably carried by a pivot 42 supported by the stand 12 and extending in parallel with the pivot 19. The drive plate 30 on its outer periphery carries teeth 44 which are adapted to mesh with the teeth of the tooth wheel 40 when the place 30 takes a second position, illustrated in the Figures. A first position of the drive plate 30 corresponds to the situation in which it is in engagment with one of the clutch plates 28 in the manner indicated above. The plate 30 carried on the rotary shaft of the motor 32 is moved between its said first and second positions by means of the slide 34 carrying the motor 32 being shifted on the guide 36 as controlled by the control system of the robot 4.

The transmission ratio of the transmission consisting of the meshing tooth wheels 38 and 40 and toothed drive plate 30 is such as to impart a suitable rotational speed to the holder 16 by the motor 32 when the drive plate 30 takes its second position, in which the motor shaft is connected via said transmission to drive the rotary shaft of the holder 16.

As is specifically illustrated in FIG. 2, the pivot 18 of the holder 16 outside the tooth wheel 38 also fixedly carries a round disc 46. The disc 46 near its periphery has diametrically opposite holes 48 located at the same distance from the pivot 18. The wall 37 of the main stand 12, on its side opposite to the side carrying the guide 36, and outside the plane of the disc 46, carries a pneumatic cylinder-piston device 50 having an open-ended bore in which a pin 52 actuable by the piston of the device 50 is movably guided. More particularily, said bore of the device 50 extends in parallel with the pivot 18 at the same distance from the latter as the holes 48. Furthermore, the location of the device 50 along the periphery of the disc 46 is such as to make possible introduction of the pin 52 in either one of the holes 48, for arresting the holder 16 in a determined position, in which either one of the latch plates 28 is located coaxially with the drive plate 30. In said determined position of the holder 16 the longitudinal axis of the beam 22, lying in the common plane of the axes of the latch plates 28 and drive plate 30, extends as indicated by the dashed line 54 in FIGS. 3 and 4. Thus, in said position said common plane does not coincide with the plane of FIG. 1. The mode of operation of the manipulator described above is as follows:

Starting from the situation that a new work piece has been fastened the fixture supporting plates 26 and 27 to the left in FIG. 1, which take the so called loading position, and assuming that the drive plate 30 is located in its first position, the drive plate 30 is now brought to its second position, shown in the Figures, in engagement with the tooth wheel 40, and the holder is rotated half a revolution by means of the motor 32 so as to move the work piece, newly installed, to the so called operative position to the right in FIG. 1, within the operating range of the robot 4 and with the axes of the latch plate 28 and drive plate 30 coaxial. The holder 16 is now arrested in this position by means of actuation of the pin 52 so as to move it into engagement with the hole 48. Thereafter the drive plate 30 is again brought to its first position into engagement with the latch plate 28. The robot 4 now carries out its operations in co-ordination with the motor 32 making desired portions of the work piece accessible to the implement of the robot. During the same time a new work piece is mounted between the pair of fixture supporting plates 26, 27 now being in their loading position. As soon as the robot 4 has finished its operations, the same procedures as described above are repeated.

As mentioned earlier all of the different movements of the holder 16 and the motor 32 are controlled by the control system of the robot.

I claim:

1. A manipulator for positioning workpieces with respect to an industrial robot, said manipulator comprising at least two fixture supports each having fixture means for holding a work piece, moving means for moving one of said fixture supports from a loading position, in which exchange of a work piece held in said fixture means may take place, towards an operative position within the operating range of the robot, while simultaneously moving another one of said fixtures from the operative position towards the loading position, driving means for said moving means, and a turning servo motor common to the fixture supports and drivingly engageable with a fixture support held in the operative position so as to be able to rotate said fixture support in coordination with operational movements of the robot in order to render various surface portions and parts of the work piece accessible to an implement handled by the robot, and coupling means for drivingly coupling said motor to said moving means when the motor is out of engagement with any fixture support so as to enable use of the motor as said driving means for the moving means;

said coupling means comprise a first clutch member adapted to be driven by the motor and shiftable between a first position in which it engages a second clutch member drivingly connected to a fixture support, and a second position in which it engages a third clutch member drivingly connected to the moving means.

2. A manipulator according to claim 1, wherein said moving means comprise a rotatable common holder for the fixture supports, and said first clutch member comprises a disc rotated by the motor and on its side remote from the motor has surface engagement means adapted for engagement with complementary surface engagement means of said second clutch member and wherein said surface means and said complementary surface means engage each other in the first position of said first clutch member, and said disc on its periphery carries teeth adapted for engagement with complementary teeth on a tooth wheel forming said third clutch member and drivingly connected to said moving means, said teeth and said complementary teeth engaging each other in the second position of said first clutch member.

* * * * *